Patented June 11, 1935

2,004,763

UNITED STATES PATENT OFFICE 2,004,763

N (p-AMINO-PHENYL) MORPHOLINE AND METHOD OF PREPARING THE SAME

Herbert A. Lubs, Wilmington, Del., assignor to E. I. du Pont de Nemours & Company, Wilmington, Del., a corporation of Delaware No Drawing. Application June 11, 1932, Serial No. 616,745

6 Claims. (Cl. 260—28)

This invention relates to a new organic compound and a method of preparing the same.

Aromatic amino compounds containing a substituted amino group in the para position are well known intermediates in the production of dyes. The aromatic amino body containing a morpholine nucleus in the para position to the amino group has not been known until the present time. We have discovered such a compound and found that it is very valuable, particularly as an intermediate in the production of dyes and have further developed a method for its manufacture.

Accordingly, an object of the present invention is to provide a method for preparing a new chemical compound. Other objects will appear hereinafter.

These objects may be accomplished according to the following invention which comprises reducing N(p-nitroso-phenyl) morpholine or N(p-nitro-phenyl) morpholine to produce N(p-amino-phenyl) morpholine which is the new chemical compound. The N(p-nitroso-phenyl) morpholine has been described in German Patent 119,-785. I have found that under suitable conditions this compound can be reduced to form a new compound N(p-amino-phenyl) morpholine having the probable formula:

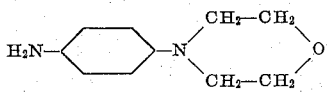

Although various reducing agents may be employed under various conditions for reducing the N(p-nitroso-phenyl) morpholine, I have found that such reduction may be satisfactorily and economically effected by adding, to an acid solution of N(p-nitroso-phenyl) morpholine hydrochloride, a metal, such as zinc dust, which will react with the acid to liberate free hydrogen.

In order to more fully illustrate my invention and the preferred mode in which I contemplate carrying the same into effect, the following example is given:

*Example.*—86 grams of N(p-nitroso-phenyl) morpholine hydrochloride were added to 325 cc. of concentrated hydrochloric acid diluted with 2000 cc. of water. The solution was agitated and 71 grams of zinc dust were slowly added thereto during agitation, meanwhile maintaining the temperature below 30° C. When all of the zinc dust had been added and the reduction was complete the solution was then made slightly alkaline with sodium hydroxide. The alkaline solution was then heated to boiling to precipitate the zinc hydroxide which was then removed by filtration. If desired, the amino-morpholine derivative may be isolated by concentrating the hot solution in vacuo. For most purposes, however, the solution can be used directly after removal of the zinc sludge.

The above method may be modified in various ways, for example, other non-oxidizing acids may be substituted for the hydrochloric acid; other metals, such as iron, may be substituted for the zinc; and other alkaline materials may be substituted for the sodium hydroxide.

The reduction of N(p-nitro-phenyl) morpholine may be accomplished by the same method under substantially the same conditions as the N(p-nitroso-phenyl) morpholine.

Pure N(p-amino-phenyl) morpholine is a colorless crystalline solid melting at about 128.8–130.2° C. Its acetyl derivative is a white crystalline solid having a melting point of 211.2–212.4° C.

While I have disclosed a specific method of producing my new compound, employing certain reducing agents, under particular conditions, it is to be understood that various other methods of reduction may be employed and that the particular method described may be modified in many ways without departing from the spirit of my invention. Accordingly, the scope of my invention is to be limited solely by the appended claims construed as broadly as is permissible in view of the prior art.

I claim:

1. The process of producing N(para-amino-phenyl) morpholine which comprises treating a solution of a member of the group consisting of N(p-nitroso-phenyl) morpholine and N(p-nitro-phenyl) morpholine in a non-oxidizing acid with a metal such as will react with the acid to liberate free hydrogen.

2. The process of producing N(para-amino-phenyl) morpholine which comprises treating a solution of N(p-nitroso-phenyl) morpholine in a non-oxidizing acid with a metal such as will react with the acid to liberate free hydrogen.

3. The process of producing N(para-amino-phenyl) morpholine which comprises treating a hydrochloric acid solution of N(p-nitroso-phenyl) morpholine hydrochloride with a metal such as will react with the acid to liberate free hydrogen.

4. The process of producing N(para-amino-phenyl) morpholine which comprises slowly adding zinc dust to a hydrochloric acid solution of N(p-nitroso-phenyl) morpholine hydrochloride with agitation.

5. The process of producing N(para-amino-phenyl) morpholine which comprises slowly adding iron to a hydrochloric acid solution of N(p-nitroso-phenyl) morpholine hydrochloride with agitation.

6. N(para-amino-phenyl) morpholine.

HERBERT A. LUBS.